United States Patent
Andreotti et al.

(10) Patent No.: US 11,836,969 B2
(45) Date of Patent: *Dec. 5, 2023

(54) PREPROCESSING IMAGES FOR OCR USING CHARACTER PIXEL HEIGHT ESTIMATION AND CYCLE GENERATIVE ADVERSARIAL NETWORKS FOR BETTER CHARACTER RECOGNITION

(71) Applicant: John Snow Labs Inc., Lewes, DE (US)

(72) Inventors: Jose Alberto Pablo Andreotti, Cordoba (AR); David Talby, Mercer Island, WA (US)

(73) Assignee: John Snow Labs Inc., Lewes, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/483,878

(22) Filed: Sep. 24, 2021

(65) Prior Publication Data

US 2022/0012522 A1 Jan. 13, 2022

Related U.S. Application Data

(63) Continuation of application No. 16/664,935, filed on Oct. 27, 2019, now Pat. No. 11,176,410.

(51) Int. Cl.
*G06V 30/414* (2022.01)
*G06V 10/82* (2022.01)
(Continued)

(52) U.S. Cl.
CPC ............ *G06V 10/82* (2022.01); *G06F 18/214* (2023.01); *G06T 3/40* (2013.01); *G06T 3/608* (2013.01);
(Continued)

(58) Field of Classification Search
CPC .......... G06T 10/20; G06T 10/28; G06T 3/40; G06T 3/608; G06T 5/006; G06T 5/002;
(Continued)

(56) References Cited

U.S. PATENT DOCUMENTS 5,062,141 A * 10/1991 Nakayama ............. G06V 10/24
382/196
5,825,920 A * 10/1998 Kitamura ............... G06V 10/28
382/290
(Continued)

OTHER PUBLICATIONS

Tomas Mikolov, Stefan Kombrink, Lukas Burget, Jan "Honza" Cernocky, Sanjeev Khudanpur Brno University of Technology, Speech@Fit, Czech Republic Department of Electrical and Computer Engineering, Johns Hopkins University, USA 2011 "Extensions of Recurrent Neural Network Language Model." [retrieved on Sep. 27, 2021]. Retrieved from the Internet: <URL:https://www.fit.vutbr.cz/research/groups/speech/publi/2011/mikolov_icassp2011_5528.pdf>.

(Continued)

*Primary Examiner* — Sean T Motsinger
(74) *Attorney, Agent, or Firm* — Richard G. Topolewski

(57) ABSTRACT

A text extraction computing method that comprises calculating an estimated character pixel height of text from a digital image. The method may scale the digital image using the estimated character pixel height and a preferred character pixel height. The method may binarizes the digital image. The method may remove distortions using a neural network trained by a cycle GAN on a set of source text images and a set of clean text images. The set of source text images and clean text images are unpaired. The source text images may be distorted images of text. Calculating the estimated character pixel height may include summarizing the rows of pixels into a horizontal projection, and determining a line-repetition period from the projection, and quantifying the portion of the line-repetition period that corresponds to the text as the estimated character pixel height. The method may extract characters from the digital image using OCR.

13 Claims, 11 Drawing Sheets

(51) Int. Cl.
| | | |
|---|---|---|
| *G06T 7/60* | (2017.01) | |
| *G06T 3/60* | (2006.01) | |
| *G06T 5/00* | (2006.01) | |
| *G06T 3/40* | (2006.01) | |
| *G06F 18/214* | (2023.01) | |
| *G06V 30/146* | (2022.01) | |
| *G06V 30/162* | (2022.01) | |
| *G06V 30/19* | (2022.01) | |
| *G06V 30/10* | (2022.01) | |

(52) U.S. Cl.
CPC .............. *G06T 5/002* (2013.01); *G06T 5/006* (2013.01); *G06T 7/60* (2013.01); *G06V 30/1478* (2022.01); *G06V 30/162* (2022.01); *G06V 30/19173* (2022.01); *G06V 30/414* (2022.01); *G06T 2207/20084* (2013.01); *G06T 2207/30176* (2013.01); *G06V 30/10* (2022.01)

(58) Field of Classification Search
CPC .............. G06T 7/60; G06T 2207/20084; G06T 2207/30176; G06V 30/00–43
See application file for complete search history.

(56) References Cited

U.S. PATENT DOCUMENTS

| | | | | |
|---|---|---|---|---|
| 9,014,481 B1* | 4/2015 | Luqman | ............... | G06V 10/469 382/185 |
| 9,286,514 B1* | 3/2016 | Newman | ................ | G06V 30/40 |
| 9,558,523 B1* | 1/2017 | Hodge | .................. | G06V 20/52 |
| 10,997,463 B2* | 5/2021 | Wang | ................... | G06V 30/153 |
| 11,176,410 B2* | 11/2021 | Andreotti | ............... | G06V 10/82 |
| 2002/0102022 A1* | 8/2002 | Ma | ....................... | G06V 30/413 382/284 |
| 2007/0050419 A1* | 3/2007 | Weyl | ...................... | G06Q 30/00 |
| 2007/0206877 A1* | 9/2007 | Wu | .................... | G06V 30/1478 382/275 |
| 2010/0054585 A1* | 3/2010 | Guillou | ............... | G06V 20/635 382/164 |
| 2010/0086207 A1* | 4/2010 | Bernal | ..................... | G06T 1/00 382/173 |
| 2011/0075220 A1* | 3/2011 | Chiba | .................. | H04N 1/3872 358/1.18 |
| 2011/0222794 A1* | 9/2011 | Galic | ............... | G06V 30/18095 382/298 |
| 2012/0113489 A1* | 5/2012 | Heit | ..................... | G06V 10/242 382/140 |
| 2013/0028481 A1* | 1/2013 | Wu | ....................... | G06V 20/63 382/105 |
| 2014/0168478 A1* | 6/2014 | Baheti | .................. | G06V 10/235 348/240.99 |
| 2019/0180154 A1* | 6/2019 | Orlov | ....................... | G06N 3/04 |
| 2019/0221001 A1* | 7/2019 | Dassa | ................ | H04N 21/4316 |
| 2019/0278986 A1* | 9/2019 | Nepomniachtchi | ........................ | H04N 1/00734 |
| 2019/0294921 A1* | 9/2019 | Kalenkov | .............. | G06N 5/046 |
| 2020/0026947 A1* | 1/2020 | Kuhlmann | ........... | G06V 10/242 |
| 2020/0065574 A1* | 2/2020 | Kuhlmann | ........... | G06V 30/153 |
| 2020/0311883 A1* | 10/2020 | Ueno | .................... | G06V 10/273 |
| 2020/0334486 A1* | 10/2020 | Joseph | ..................... | G06T 5/002 |
| 2020/0387750 A1* | 12/2020 | Shcherbinin | .......... | G06T 3/4053 |
| 2020/0394506 A1* | 12/2020 | Louizos | ................. | G06N 7/005 |

OTHER PUBLICATIONS

Stoyan Mikov Linguistic Modelling Laboratory LPDP—Bulgarian Academy of Sciences, Klaus U. Schultz CIS University of Munich "Fast String Correction with Levenshtein—Automata" [retrieved on Sep. 27, 2021]. Retrieved from the Internet: <URL:https://github.com/tpn/pdfs/blob/master/Fast%20String%20Correction%20with%20Levenshtein-Automata%20(2002)%20(10.1.1.16.652).pdf>.

Eric Sven Ristad Mnemonic Technology, Peter N. Yianilos Edgestream Partners, LP "Learning String Edit Distance" Oct. 1996; Revised Oct. 1997 Research Report CS-TR-532-96 [retrieved on Sep. 27, 2021]. Retrieved from the Internet: <URL:https://www.researchgate.net/publication/3192848_Learning_String_Edit_Distance>.

A. Papandreou, B. Gatos, G. Louloudis and N. Stamapopoulos, Computational Intelligence Laboratory Institute of Informatics and Telecommunications National Center for Scientific Research "Demokritos" GR-15310 Athens, Greece "ICDAR 2013 Document Image Skew Estimation Contest (DISEC '13)" [retrieved on Sep. 27, 2021]. Retrieved from the Internet: <URL:http://users.iit.demokritos.gr/~bgat/ICDAR_2013_Papandreou.pdf>.

A. Papandreou, B. Gatos, Computational Intelligence Laboratory, Institute of Informatics and Telecommunications, National Research Center "Demokritos" GR-15310 Athens, Greece "A Novel Skew Detection Technique Based on Vertical Projections" [retrieved on Sep. 27, 2021]. Retrieved from the Internet: <URL:http://users.iit.demokritos.gr/~bgat/ICDAR2011_skew.pdf>.

Kareem Mokhtar, Syed Saqib Bukhar, Andreas Dengel, German Research Center for Artificial Intelligence (DFKI) Kaiserslautern, Germany University of Kaiserslautern, Germany German University in Cairo, Egypt. "OCR Error Correction : State-of-the-art vs An NMT Based Approach.".

Yu-Sheng Chen, Yu Ching Wang, Man Hsin Kao, Yung-Yu Chuang, National Taiwan University. "Deep Photo Enhancer: Unpaired Learning for Image Enhancement from Photographs with GANs.".

* cited by examiner

Original — 802

Ordering Provider: A
Ordered On: 02/02/1
Dose (Remaining/Tot
Frequency: ONCE
Admin Instructions: A
Timestamps    Acti

800

Cleaned — 804

Ordering Provider: A
Ordered On: 02/02/1
Dose (Remaining/Tot
Frequency: ONCE
Admin Instructions: A
Timestamps    Acti

FIG. 8

| | Original 1002 | Cleaned 1004 |
|---|---|---|
| 1 - | Zoloft | Zoloft |
| 2 - | Hytrir | Hytrir |
| 3 - | MiraLa | MiraLa |
| 4 - | Multiv | Multiv |
| 5 - | Ascort | Ascort |
| 6 - | Protor | Protor |
| 7 - | Zofrar | Zofrar |
| 8 - | Calmos | Calmos |

FIG. 10

PREPROCESSING IMAGES FOR OCR USING CHARACTER PIXEL HEIGHT ESTIMATION AND CYCLE GENERATIVE ADVERSARIAL NETWORKS FOR BETTER CHARACTER RECOGNITION

BACKGROUND OF THE INVENTION

Field of the Invention

This invention relates generally to extracting text from images using an optical character recognizer and more specifically to preprocessing an image using a character pixel height estimation and a preprocessing neural network trained by a cycle generative adversarial network.

Background of the Invention

Generally an optical character recognizer engine (OCR Engine) extracts text from a digital image. However, OCR Engines fail to extract all the text characters accurately especially when the text in the image are distorted for example by noise (e.g. stray dots of black, smudges, lines, stray marks, etc.), bad image lighting (e.g. characters that are too light, i.e. thin strokes), warping of the text (e.g. the line of text fails to be a straight line, but instead curves in the image with the non-flat paper). Given distortions, the character recognition rate of OCR engine can decrease.

A text extraction process will often preprocess an image of text to try to improve the recognition rate of the OCR Engine. Preprocessing the image can include enhancing or sharpening of the image. Preprocessing may include denoising (removing salt and pepper type distortions), and erosion to thicken thin character.

The removal of noise and the related process of 'erosion' that may be used to thicken the strokes of characters may make the strokes so thick that the character cannot be recognize any longer, or remove what is thought to be salt and pepper noise but was actually a light character.

Therefore, there is a need for a preprocessing method that eliminates noise and uses erosion to thicken the strokes on the character but leaves the characters intact so the OCR Engine has improved accurate character recognition rate.

SUMMARY OF THE INVENTION

The present disclosure describes a text extraction computing method. The method may include calculating an estimated character pixel height of text from a digital source image having lines of text. The text extraction method may also include scaling the digital image using the estimated character pixel height and a preferred character pixel height. The text extraction method may also include binarizing the digital image. The text extraction may also include extracting characters from the digital image using an optical character recognizer.

The text extraction computing method may further include removing distortions using a neural network trained by a cycle generative adversarial network on a set of source text images and a set of clean text images. Where the set of source text images and the set of clean text images are unpaired, and where the source text images are distorted images of text.

Calculating the estimated character pixel height may include summarizing the rows of pixels into a horizontal projection, and determining a line-repetition period from the horizontal projection, and quantifying the portion of the line-repetition period that corresponds to the text as the estimated character pixel height. The text extraction computing method where determining the line-repetition period may use signal autocorrelation, or Fast Fourier Transform.

The text extraction computing method may further include the steps of: de-skewing the digital source image by rotating the digital source image; removing distortion from the digital source image; and postprocessing the extracted characters. The text extraction computing method may include postprocessing the extracted characters using a Levenshtein automaton model and a deep learning language model.

BRIEF DESCRIPTION OF THE DRAWINGS

FIGS. 8, 9 and 10 show examples of images that have been preprocessed.

DETAILED DESCRIPTION

A text extraction method may start by acquiring a digital image from various sources such as an optical scanner, a flatbed scanner, an auto feed scanner, a document feeder, a smart phone camera, a device equipped with a camera or anything capable of producing a digital image with text image. Alternatively the text extraction method may just be presented a digital image that has text in it.

Figure 1:
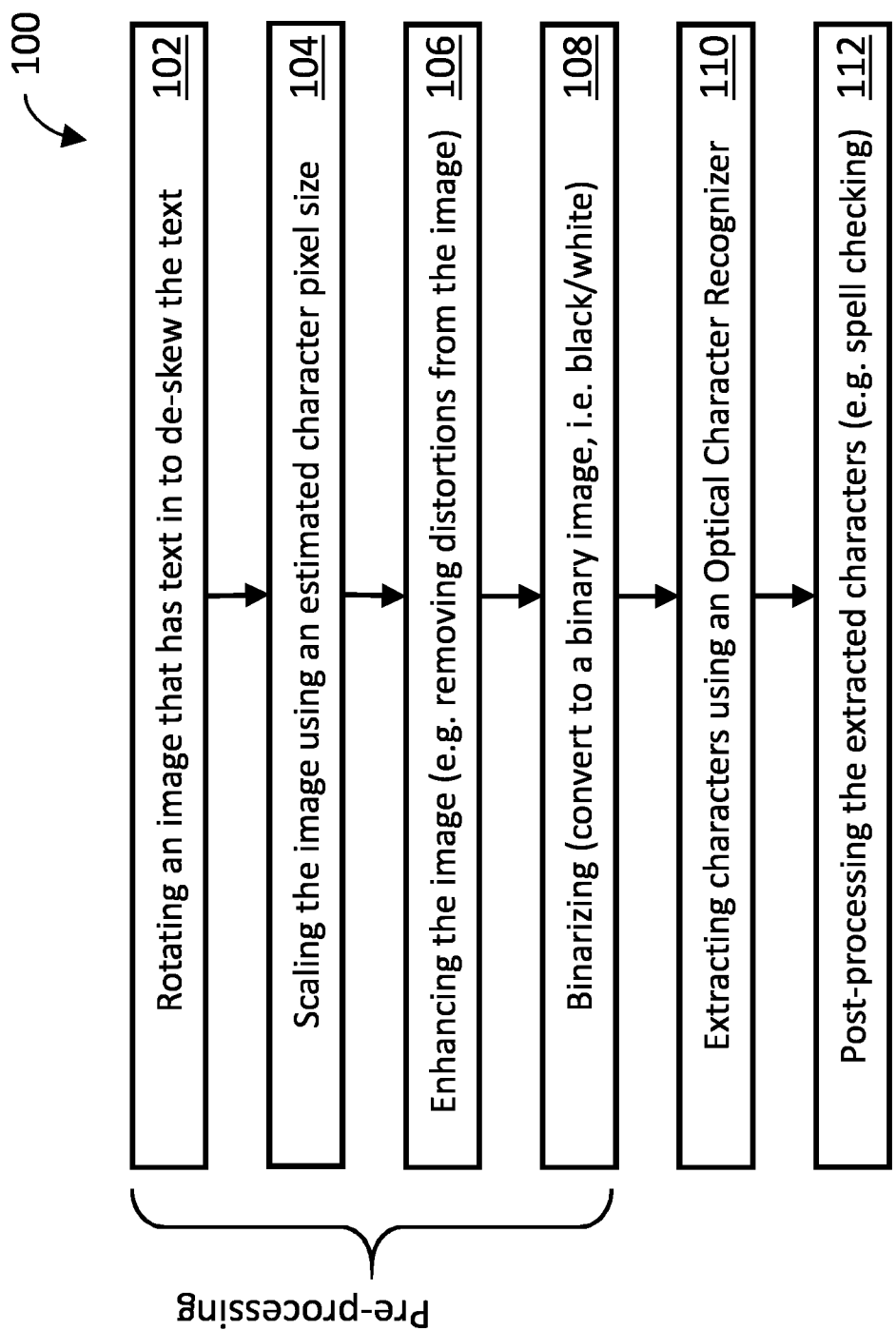
FIG. 1 illustrates a flowchart of an exemplary image text extraction process.

FIG. 1 illustrates an example implementation of a process flow 100 that may use character pixel height estimation and a preprocessing neural network trained using a cycle Generative Neural Network (cycle GAN). The process flow 100 shows preprocessing in boxes 102, 104, 106, and 108 that may include a preprocessing neural network trained using a cycle GAN.

At box 102 preprocessing may begin, with the image being de-skewed. The text extraction method may de-skew an image containing image text by rotating the image. The text extraction method may accomplish de-skewing by any number of methods. The digital image may have a non-background color, e.g. black, in the digital image where the black may be text. The method to de-skew the text in an image may comprise determining the angle of rotation that provides the highest average variation in the peaks when vertically summarizing the non-background color. The de-skewed image document may draw a boundary box around the non-background colors and determine an angle or rotation that minimize the area in the boundary box. The de-skewing may combine the vertical projection and minimizing the boundary box.

Optical Character Recognizer software is available as open source or purchased pieces of code that when provided an image containing text will perform an Optical Character Recognition process and return extracted characters from the image. Some examples of Optical Character Recognizers, i.e. Optical Character Recognition software, are Tesseract, ABBYY, COCR, OCRopus and OmniPage.

At box 104, the process flow 100 may continue preprocessing and may scale the image using an estimated character pixel height of the image text. Adjusting the character pixel height of the images sent to the Optical Character Recognizer can have an important impact on OCR performance. For example the Tesseract OCR engine has been found to work best with a preferred character pixel height of 34 pixels. By scaling images so the characters are of the preferred character pixel height it has been seen to improve the Tesseract OCR recognition by up-to 10%. That is 10% absolute points so an increase from 80% to 90% of the characters in the image were recognized. For example, suppose the font size in the image is 22 pixels, and the preferred size is 34 pixels then the image may be scaled by 1.54 times (34/22=1.54), before sending it to the OCR engine to improve the recognition accuracy. Different images may have different font sizes, i.e. different character pixel heights, and the process flow 100 may automatically detect the estimated character pixel height and scale the image so the characters in the image are of the preferred character pixel height for the OCR engine.

There are many ways the estimated character pixel height may be determined. The text extraction process may estimate the character pixel height using a horizontal projection of the rows of pixels based on the color of the pixels. For example a row in-between lines of text are white and would have a higher value and black text rows would have a lower number. Then when moving vertically the line-repetition period of the image text may be apparent. The line-repetition period may be determined. Once the line-repetition period is determined the text extraction process may qualify the portion of the line-repetition period that corresponds to the line of text, i.e. the estimated character pixel height. This document describes this approach in more detail below.

Another way of determining the estimated character pixel height may involve determining the height of the characters by looking at columns of pixels. A column of pixels would have background color (e.g. white) and text color (typically black, but could be any color). In a column the black-segments (i.e. colored segments) will be a vertical slice of a character of the text. The height of the black-segments may be used to get an estimated pixel height. For example, taking the average of the black-segment heights for all pixel columns may be able to give the character pixel height or be correlated to the character pixel height. Alternatively looking at a distribution graph of the black-segment heights may show breaks in the density and from that the estimated character pixel height may be determined.

At box 106, the process flow 100 may continue preprocessing by remove distortions from the image. The image preprocessing may blur or sharpen the digital image. The image preprocessing may include a noise removal operation. The image preprocessing may include a distortion removal process for example applying erosion to the digital image, which generally results in expanding of the dark areas of the image, or dilation which general results in an contraction of the dark areas of the image.

The term distortion for image text refers to image imperfections for example noise (e.g. stray dots, smudges, lines, stray marks, etc.), scanning problems like skinny or gray character renditions, warping of the text so the line of text is not straight but is instead wavy as would occur if taking a picture of an open book where the arch of the page from straight up out of the binding to the end of the paper that is flat on the table, or distortions of the paper being a scrolled up receipt, or creases in paper that has been laid flat, or crumpled paper that has been straighten or other issues with the image where the image text is not just clean text on a uniform background.

The image preprocessing may subject the digital image to erosion. The process flow may erode the digital image in order to increase the width and height of the darker components in the image. Erosion may help overcome minor misalignments and compensate for minute variations in image text. Erosion may be especially useful in increasing the area around the characters in the digital image.

At box 108, the process flow 100 may continue preprocessing by binarizing (also known as thresholding) the digital image. The process flow 100 may convert the color or gray-scale image to a binary image. The term "binary image" refers to an image with only two colors (e.g. black and white), so any particular pixel in the image may be stored as either a 0 or 1, or stored as 0 and 256, or stored (0,0,0) and (256,256,256) i.e. binary.

The binarizing process may use a fixed threshold or an adaptive threshold. The threshold to convert a pixel to black or white may be calculated based on the image presented. For example, a lighter image might have a higher threshold so more pixels of the image will be converted to black, while an image that overall is darker may have use a lower threshold.

For example the text extraction method may to do threshold based on a grid of pixels where each pixel has a value between 0 and 255, where 0 may be black, and 255 may be white. Energy, brightness, and whiteness are synonyms.

The important parts (that is the characters, not the noise) in the image may have values (dark) representing black letters on a white page, for example having values of less than 20. To binarize, a process may take all the pixels in the image that have a value above 20, consider them to be too white and set them to 255.

For some images this desired pattern holds and this kind of hard-coded preprocessing will work, for other images it won't as in images where both valuable information (characters) and noise lays on both sides of the '20' threshold. So in these cases the text extraction method needs to adapt the threshold to any image, to any noise pattern, and potentially to different regions within the same image.

For picking the threshold dynamically many techniques exists, both global (use the complete image to make a decision, for example Otsu's thresholding method) or locally (the method only considers neighboring pixels to the pixel being binarized, for example using the mean average method).

At step 110, the process flow 100 may present the preprocessed image to an OCR engine that can recognize characters and provide extracted characters from the image.

At step 112, the text extraction method may postprocess the extracted character. The postprocessing may include spell check and grammar check, and may include a Levenshtein automaton model and a deep learning language model. The postprocessing may include grammar checks and spell checks.

The Levenshtein automation model can quantify or weight the increasing difficulty in changing the scanned characters into a dictionary word and a deep leaning language model can use the probability of words being next to each other to weight the less likely combination higher. Using these two weights the lowest weighted sequence of words may be the extracted words of the text extraction method.

For instance, if the extracted characters include the following:

he states ha's teen compliant with his medications. although he states he ran out of his Eliquis & few wesks ago. he denies having any blood in his stools or meiena, although he does lake iron pills and states his stools are frequently black his hemoglobin is al baseline, After postprocessing the extracted text may be improved to the following content:

he states has been compliant with his medications. Although he states he ran out of his Eliquis & few weeks ago. he denies having any blood in his stools or melena, although he does take iron pills and states his stools are frequently black his hemoglobin is at baseline.

Figure 2:
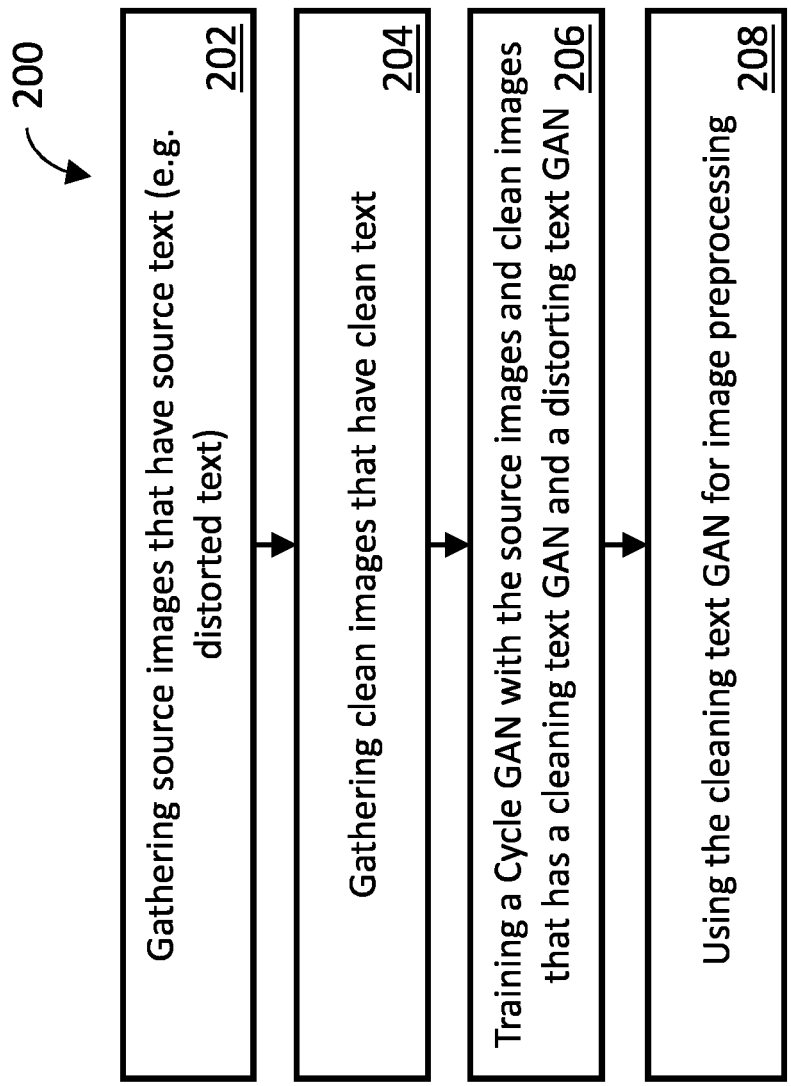
FIG. 2 illustrates a way to use a cycle Generative Adversarial Network (GAN) to create a preprocessing neural network.

FIG. 2 illustrates a process flow 200 that a text extraction method may follow to use a cycle Generative Adversarial Network (GAN) to create a preprocessing neural network.

Generator Adversarial Network, GAN, is a machine learning technique that has a generator neural network and a discriminator neural network. The neural networks used in the GAN may be of a specific type, for example the generator neural network may be a transformer neural network. The process flow 200 may have a set of images that share some similarity, say all pictures of zebras. When the discriminator is presented a new image the discriminator decides if the new image is like the set of images, for example does the presented image contain a zebra? The job of the generator is to create an image that the discriminator will accept as being like the images in the set of images. So in this example, does the generated image contain a zebra. An oversimplified way to think about training a GAN is to think that the generator receives feedback from the discriminator if the generated images are good or not. Once the generator can fool the discriminator then the discriminator is told the generator images are fakes and then the discriminator studies the fakes and learns from them so it can again determine the fakes from the real set of images. The generator now has to improve its ability to generate images so it can again fool the discriminator. This process repeats and as the process repeats the generator and discriminator get better at their jobs and in the end the generator is able to produce very good generated images with the attributes of the set of images, e.g. generate images of zebras.

Figure 6:
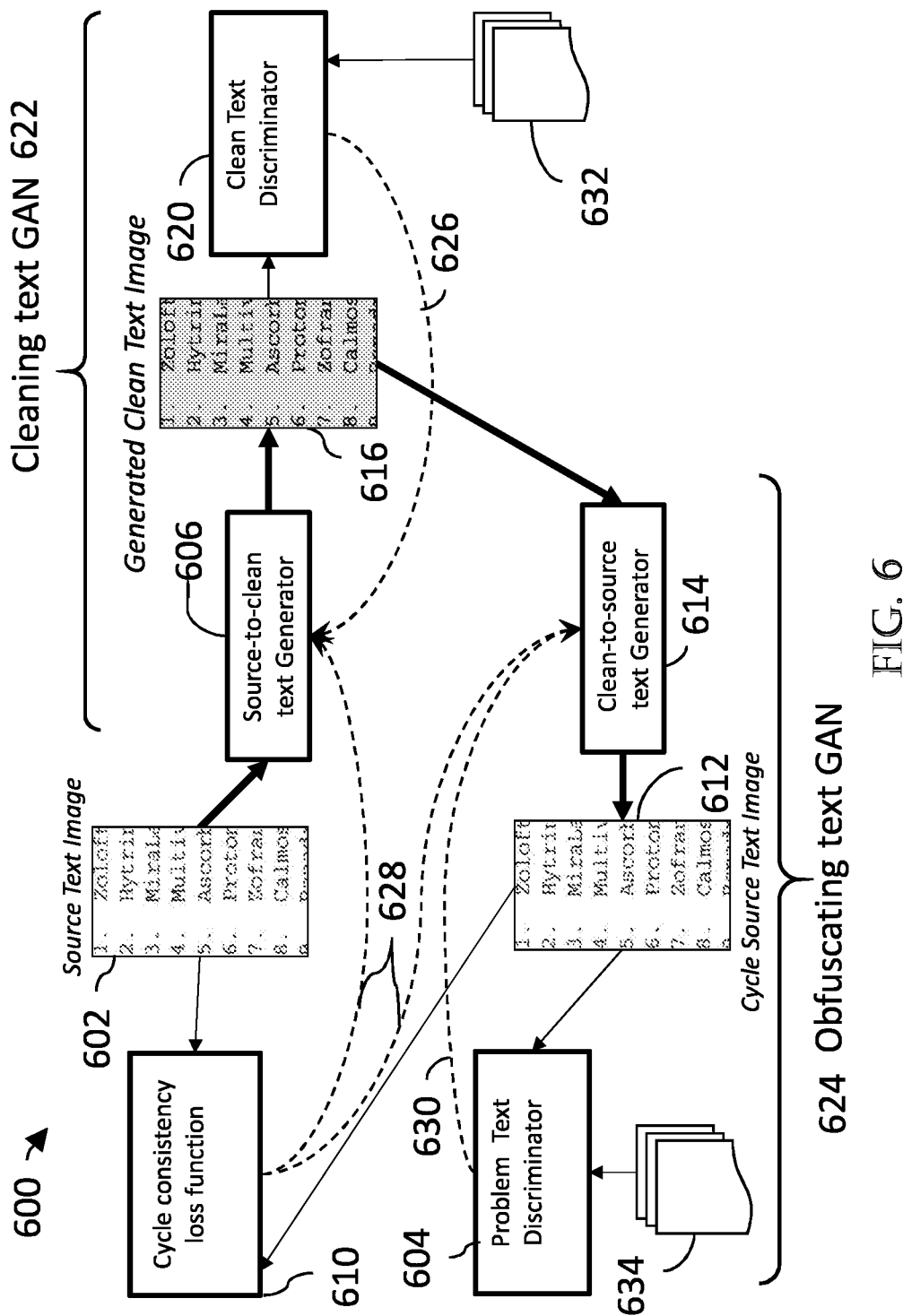
FIG. 6 illustrates a block diagram of a Cycle GAN model using a source-to-clean text generator and a clean-to-source text generator.
Figure 7:
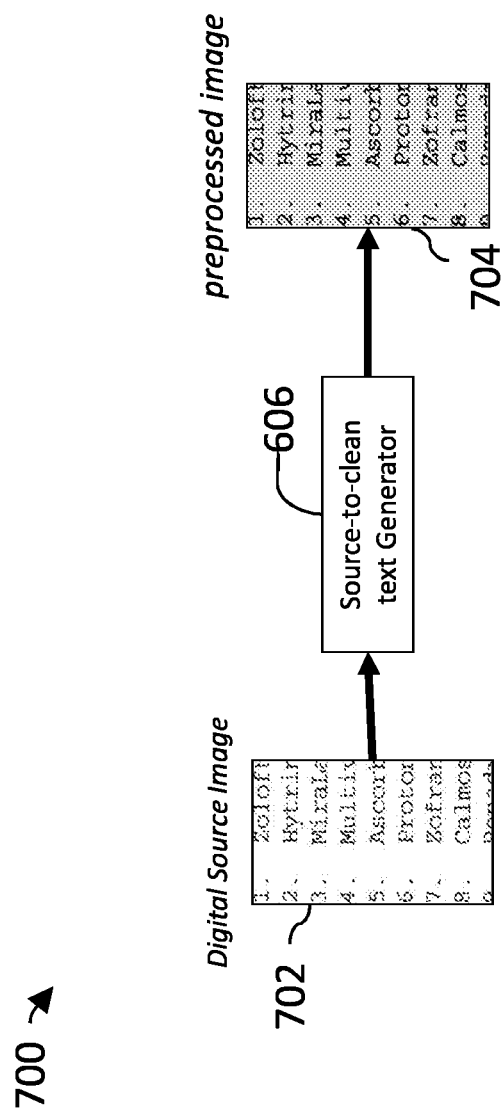
FIG. 7 illustrates using the source-to-clean text generator neural network as a preprocessing neural network to clean images with text.

Two GANs can be use together in a cycle GAN configuration and cycle GAN can do style transfer, for example transforming images of horses into images of zebras and the reverse taking a picture of a zebra and transforming it to look like a horse. In this case the styles are "obfuscated source text style" and "clean text style," The cycle GAN is trained to move images between the two styles, and the useful part of the cycle GAN is the part that can transfer from obfuscated text style to clean text style. FIGS. 6 and 7 describe in more detail cycle GAN and the useful part (a neural network) that can clean obfuscated text.

The text extraction process may use a cycle GAN trained on a set of source text images and a set of clean text images, where the set of source text images and the set of clean text images are unpaired. The term "unpaired" is in contrast to traditional paired data sets where one image would have distorted text on it and a second image would be of the same exact text but clean, rather for unpaired images there is no association between the source text image from the set of source text images and a particular target clean text image.

The process flow 200 may begin at box 202 by gathering source images, where the source text images may be problem images, that is they may share some distortion feature or a set of distortion features. For example, the source text images may share having poorly scanned text with skinny or gray stroke characters. The distortion of the images in the source set may have noise. The distortion the images in the source set share may be skewed text or warped text. The source text images may be of various fonts and sizes. The source text image may have just some distortion feature or every possible distortion feature or some set in-between.

The process flow 200 may continue at box 204 were cleaned text images may be gathered, or generated. For example The term "clean text" refers to text lacking distortions, for example high fidelity black characters made up of solid black lines on a white background. These may be good scans of pages with text on them or images generated in the computer of text on a white background.

The process flow 200 may continue at box 206 where the process flow 200 may train a cycle GAN on the source images and clean text images.

Finally the process flow 200 may continue at box 208 where the preprocessing neural network preprocesses a digital text images to improve the performance of the OCR Engine.

If the source images have noise in them, then the preprocessing neural network trained in the cycle GANs may be capable of removing noise from a digital image.

If the source images have warped text in them, then the preprocessing neural network trained in the cycle GAN may be capable of de-warping a digital image.

If the source text images contain image text that requires scaling to get a preferred character and the clean text image may have text of the preferred character height, then the preprocessing neural network may scale the text in the source images to the preferred character pixel height.

If the source text images contain skewed text then the preprocessing neural network may de-skew the text in the image.

If the source images may be color or gray scale and the clean text image set contains binary images then the preprocessing neural network may binarize the text in the image.

To have the preprocessing neural network cleaning up a number of distortions, for example both noise and warping then the source text image may contain source text images that have both noise and warped text in the source text images. Alternatively it may be best to string a series of preprocessing neural networks together, each one specialized to clean up specific issues. One preprocessing neural network to clean up noise and a second one to de-warp.

Figure 3:
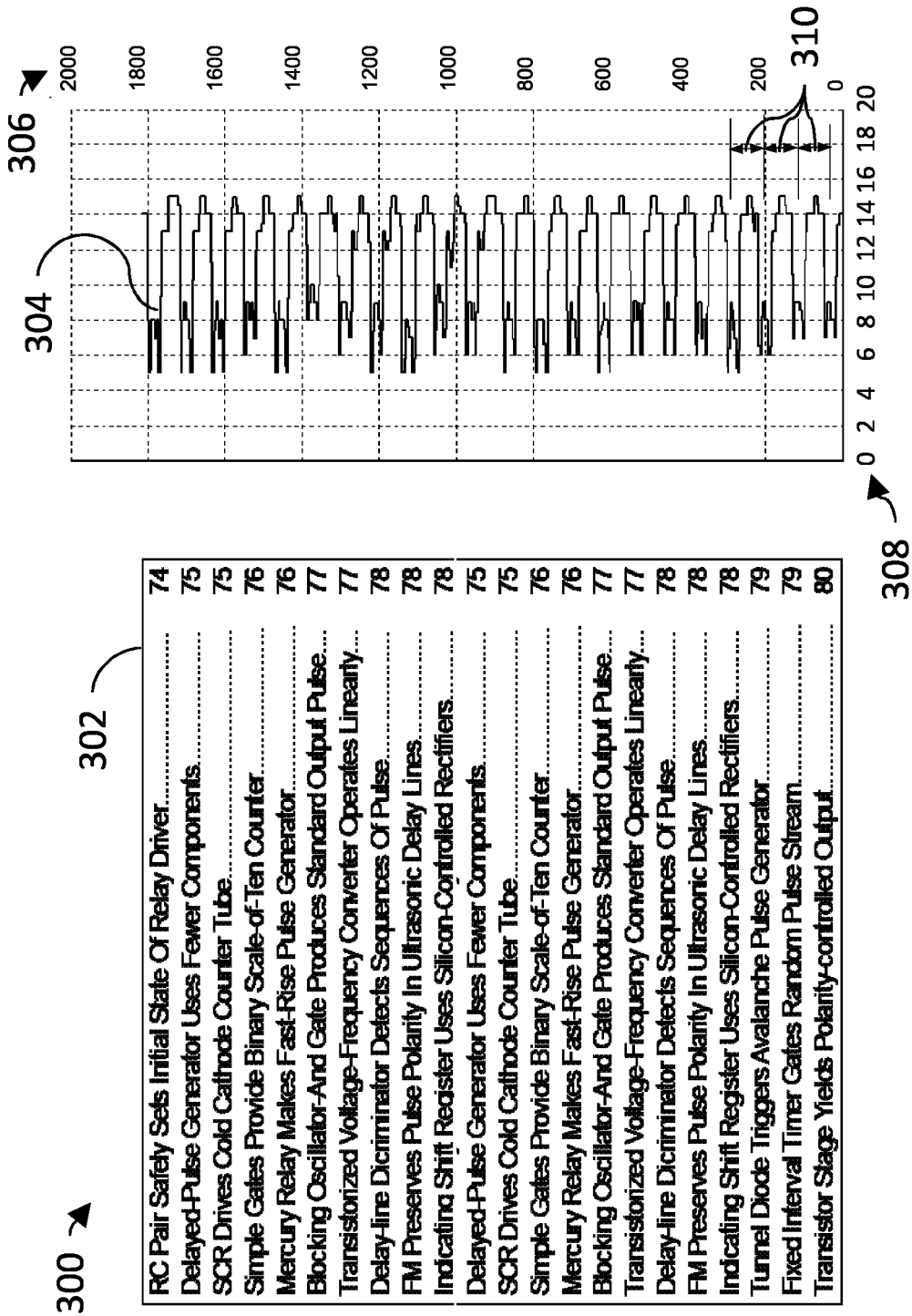
FIG. 3 illustrates projecting a digital image horizontally to create a vertical signal where large value are to the right and represent white rows and smaller values are to the left and represent black rows (i.e. a line of text).

FIG. 3 shows illustration 300 of a digital image 302 with pixel rows projected horizontally into a one-dimensional vertical signal 304. The vertical axis 306 is the pixel row. The vertical axis 306 may start with the bottom of the image being zero and the top being 1800 row of pixels high. The horizontal axis 308 is the brightness of that row of pixels, where the higher the number the brighter that row of pixels is. The vertical signal 304 may have high values (i.e. high energy or whiteness) in the space between lines and low values (dark) in the regions corresponding to black text. The vertical signal 304 will go high and low in sync with the lines of text. The text extraction process may determine the line-repetition period 310 of the lines of text on the page by finding the frequency of the repeating signal. The line-repetition period 310 may be determined in a number of ways for example using autocorrelation or Fast Fourier Transform, or any method capable of determining the period of the vertical signal 304.

Figure 4:
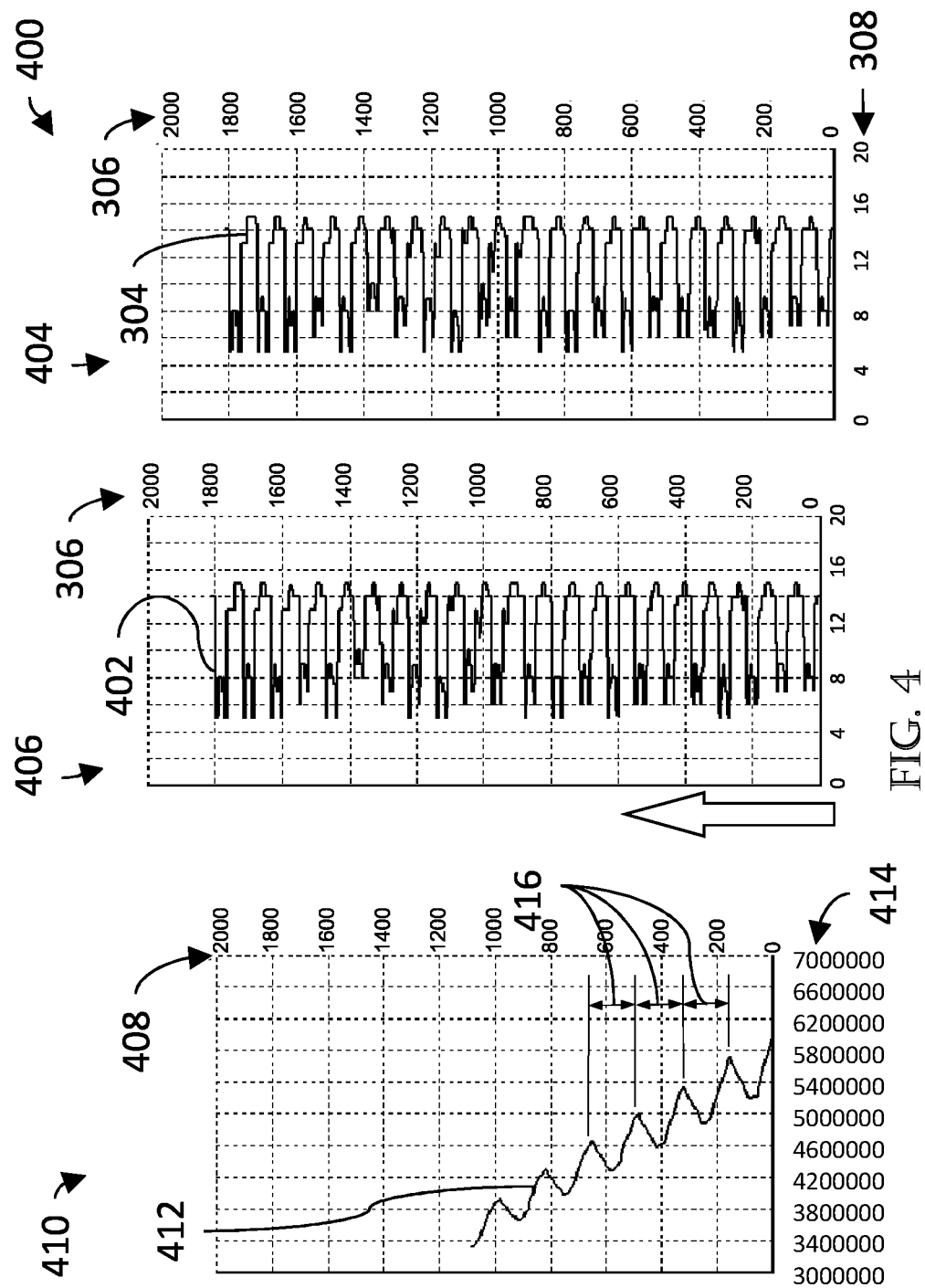
FIG. 4 illustrates using autocorrelation to determine the line-repetition period of the vertical signal.

FIG. 4 shows illustration 400 that depicts auto correlation graphically. The term "autocorrelation" (also known as serial correlation) refers to measuring the degree of similarity between a series and a shifted version of the same series. The right graph 404 shows the vertical signal 304. The center graph 406 shows a shifted vertical series 402 shifted upward by S.

An autocorrelation may be calculated between the two graphs, for example one method that may be more computationally efficient, may be to take the vertical signal 304 value for a row and multiply that by the shifted vertical series 402 value of that row. Do that for all rows and total up all the multiplied values for all the rows to come up with the autocorrelation signal 412 for a shift S as shown in graph 410. To avoid overflowing the sum of all rows, the extraction method may scale down the vertical signal and shifted vertical series 402 before calculating the autocorrelation value.

Graph 410 has the vertical axis 408 that holds the amount of shift S and the autocorrelation value is shown on the horizontal axis 414. The autocorrelation shows the period 416.

Another way the process my calculate autocorrelation between the two graphs, would be to use of a statistical correlation function between the vertical signal 304 and the shifted vertical series 402.

Given the autocorrelation the peak-to-peek value may be determined, where each peek-to-peek distance is a measurement of the period. The process may determine an overall period, for example by taking the average of the measured periods or taking the mean of the measured periods. The overall period may be the line-repetition period.

Figure 5:
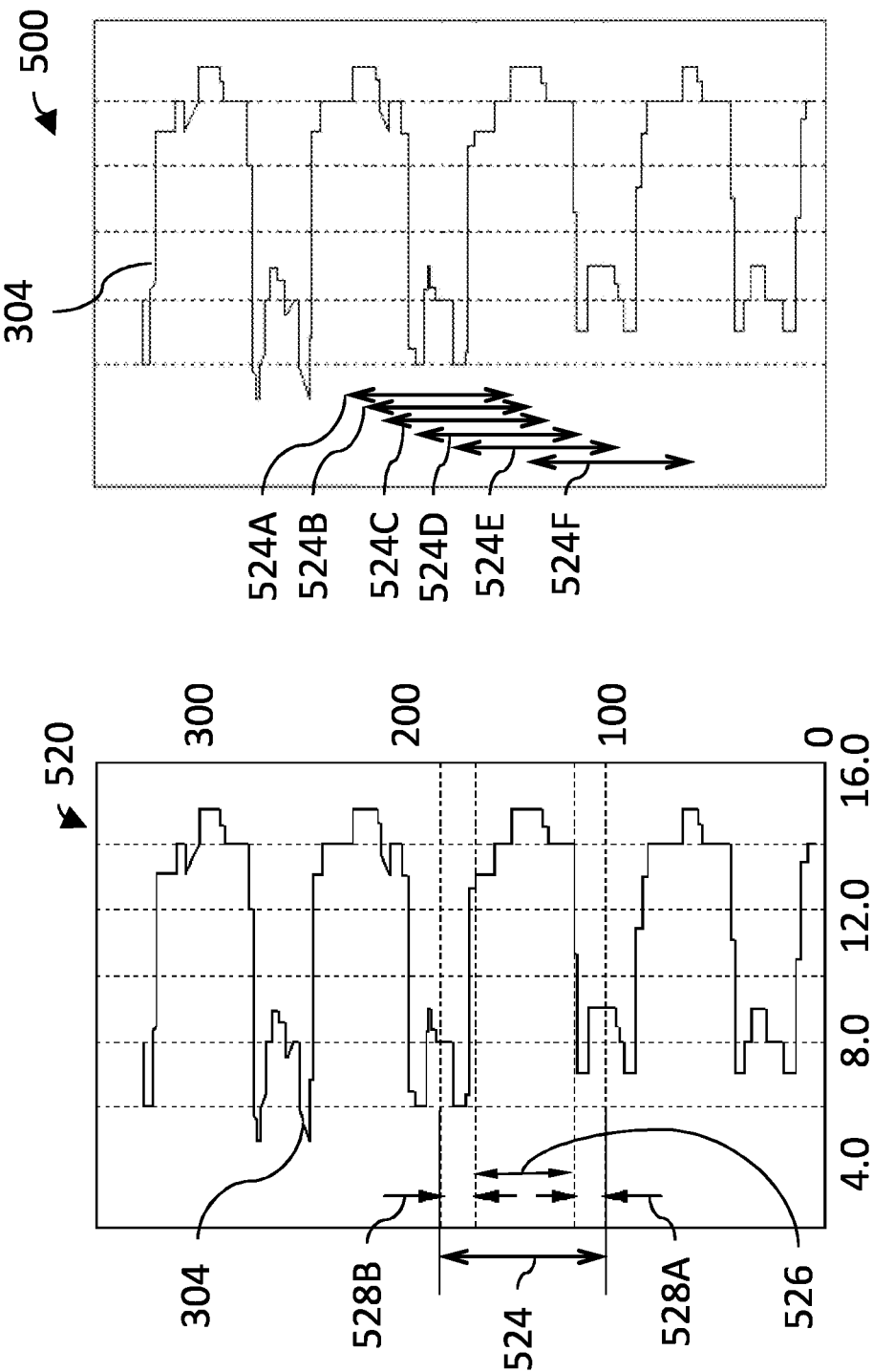
FIG. 5 illustrates an exemplary means of identifying character pixel height within the line-repetition period.

FIG. 5 shows in diagram 500 that the process may place analysis windows 524A, 524B, 524C, 524D, 524E and 524F of the height of the period at various positions on the vertical signal projection. The analysis windows may overlap each other and may cover the total period. For example the spacing of the analysis windows may be 10% of the period and there may be 10 analysis windows or the analysis windows may be spaced as close together as possible, with the next analysis window shifted only 1 pixel from the previous analysis window. The process may place the analysis windows somewhere in the center of the vertical position. The process may repeat the group of analysis windows for several vertical positions and use the following process for determining the estimated character height at the various vertical positions. The process may then summarize the results, for example by taking an average or mean of the estimated character height from the various vertical positions.

The desire is to identify the analysis window aligned to the signal. By aligning the analysis window so the maximum value of the signal is in the center of the analysis window then that analysis window is aligned to the signal, in other words the center of the window and the peak of the signal are matched up.

The process may find the analysis window aligned to the signal, by designating a center region in each analysis window 524A, 524B, 524C, 524D, 524E and 524F.

Diagram 520 shows a center region 526 that is centered on an analysis window 524. The center region 526 may start small, for example 10% of the period. For the center region 526 the process may sum the vertical signal 304 by adding up the values for each row, this is the high-energy, $E_h$ that corresponds to the white portion of the vertical signal 304. The process may sum the low energy portions 528A and 528B that lay outside the center region 526. These low-energy, $E_l$ portions corresponds to the line of text, i.e. characters. The process may calculate an energy-ratio $R_E$, for example $R_E = E_h/E_l$. The process may start with a small center region 526 and then enlarge the center region 526, for example adding a pixel row to each side and then the process may recalculate $R_E$ for the enlarged center region 526. The process may find the maximum value of $R_E$, for example the center region 526 may continue being increased until $R_E$ has reach a maximum, or the process may increase the center region 526 until it matches the line-repetition period, recording along the way the maximum $R_E$. The maximum $R_E$ corresponds to the center region 526 that is for the white space (i.e. high energy) and the low energy portions 528A and 528B may be added together and corresponds to how many pixels high the characters are, i.e. the estimated character pixel height. The text extraction process could also center on the dark portions of the signal 304 by selecting the analysis window with the minimum $R_E$.

The analysis window with the maximum $R_E$ is the analysis window that best aligned to the signal. If the analysis windows were spaced only a pixel apart then this analysis window with the maximum $R_E$ provides the estimated character pixel height. If the process spaced the analysis windows further apart, for example only 10 analysis windows then the process then may get the best alignment by repeating this process with a new set of analysis window space and even shorter distance apart and shifted from the center of the current best alignment. For example ten new analysis windows spaced 2% of the line-repetition period where the set of analysis windows are centered on the current best alignment window. This recursive process may repeat for a number of times, for example 3 times or until the alignment windows are only space a pixel apart from each other. Each new closer spaced set of analysis windows provides a more accurate alignment.

There are other ways of determining the estimated character pixel height, for example the process may use a cutoff line. The text extraction method may use a cutoff line, for example the cutoff line may run vertically through the signal 304 on diagram 500. The cut-offline may be at the average of the vertical signal 304. The cutoff line may cross the signal 304 and have hills above the line (i.e. to the right) and valleys below the line (i.e. to the left). The text extraction method may use the width of the valley (i.e. the gap or distance across the valley) as the estimated character pixel height.

FIG. 6 illustrates a diagram 600 showing the training of a source-to-clean text generator 606 using cycle GAN. Cycle GAN is a machine learning technique that uses two Generative Adversarial Networks (GAN) and a cycle consistency loss function 610 to train neural networks.

In the diagram 600 the first GAN is a cleaning text GAN 622 with a source-to-clean text generator 606 and a clean text discriminator 620. The second GAN is an obfuscating text GAN 624 with a clean-to-source text generator 614 and a problem text discriminator 604. The cleaning text GAN 622 converts a source text image 602 to a generated clean text image 616. The obfuscating text GAN 624 converts the clean text image 616 to a cycle source text image 612. More specifically during training the source-to-clean text generator 606 converts the source text image 602 to a generated clean text image 616. Then the clean-to-source text generator 614 converts the generated clean text image 616 to the cycle source text image 612.

The cycle GAN training will adjust the source-to-clean text generator 606 and the clean-to-source text generator 614 based on two sources of feedback (i.e. error) each. For the source-to-clean text generator 606 the first source of feedback is from the clean text discriminator 620 that provides a clean text discriminator error 626 to help make the text cleaner and thus easier to read. The clean text discriminator 620 is optimized to differentiate between real clean text images 632 and fake (i.e. fabricated) generated clean text images 616 generated by the source to clean text generator 606. The clean text discriminator 620 generates the clean text discriminator error 626 that quantifies how far off the generated clean text image 616 is from looking like clean text. The second source of feedback for the source-to-clean text generator 606 is from a cycle consistency loss function 610 that determines a cycle consistency loss 628, this feedback is to ensure the characters from the source text image 602 are retained, and that the source-to-clean text generator 606 does not make up just any clean characters but makes ones that match the characters in the source text image 602.

During training, the system will present the clean text discriminator 620 with both generated clean text images 616 and with real clean text images 632, and the clean text discriminator 620 has to decide if the presented image is fake or real. So two errors may occur. The first error that may occur when a real clean text image 632 is input and the clean text discriminator 620 says it is a fake. The second error that may occur is when a generated clean text image 616 is input and the clean text discriminator 620 says it is real.

For the clean-to-source text generator 614 the first source of feedback is from the problem text discriminator 604 that provides a problem text discriminator error 630 to help make the text obfuscated like the other problem source text in the set of problem source text images 634. The problem text discriminator 604 is optimized to differentiate between problem source text images 634 generated by a clean-to-source text generator 614 the problem text discriminator 604 generate the problem text discriminator error 630 which quantifies how far off the generated cycle source text image 612 is from looking like problem text. The second source of feedback for the clean-to-source text generator 614 is the cycle consistency loss 628, this feedback is to ensure the characters from the source text image 602 are retained, so that the clean-to-source text generator 614 does not just obfuscate the characters in a random way but in a way that allows them match the characters in the source text image 602.

During training, the system will present the problem text discriminator 604 with both cycle source text images 612 and with problem source text images 634, and the problem text discriminator 604 has to decide if the presented image is fake or real. So two errors may occur. The first error that may occur when a problem source text image 634 is input and the problem text discriminator 604 says it is a fake. The second error that may occur is when a cycle source text image 612 is input and the problem text discriminator 604 says it is real.

Once the cycle GAN has been trained to optimize the error (e.g. get the lowest of some combination of the error rates., e.g. lowest average, thus reaching a Nash Equilibrium where neither the discriminator nor the generator can improve any more,) and it is able to successfully move images between the clean style and the obfuscated style then the source-to-clean text generator 606 may be useful as a preprocessing neural network to clean an image ahead of OCR.

FIG. 7 illustrates a block diagram 700 showing the use of the source-to-clean text generator neural network 606 as a preprocessing neural network for the text extraction process. The text extraction method may provide a digital source image 702 to the source-to-clean text generator 606 so it may produce a preprocessed image 704.

Figure 9:
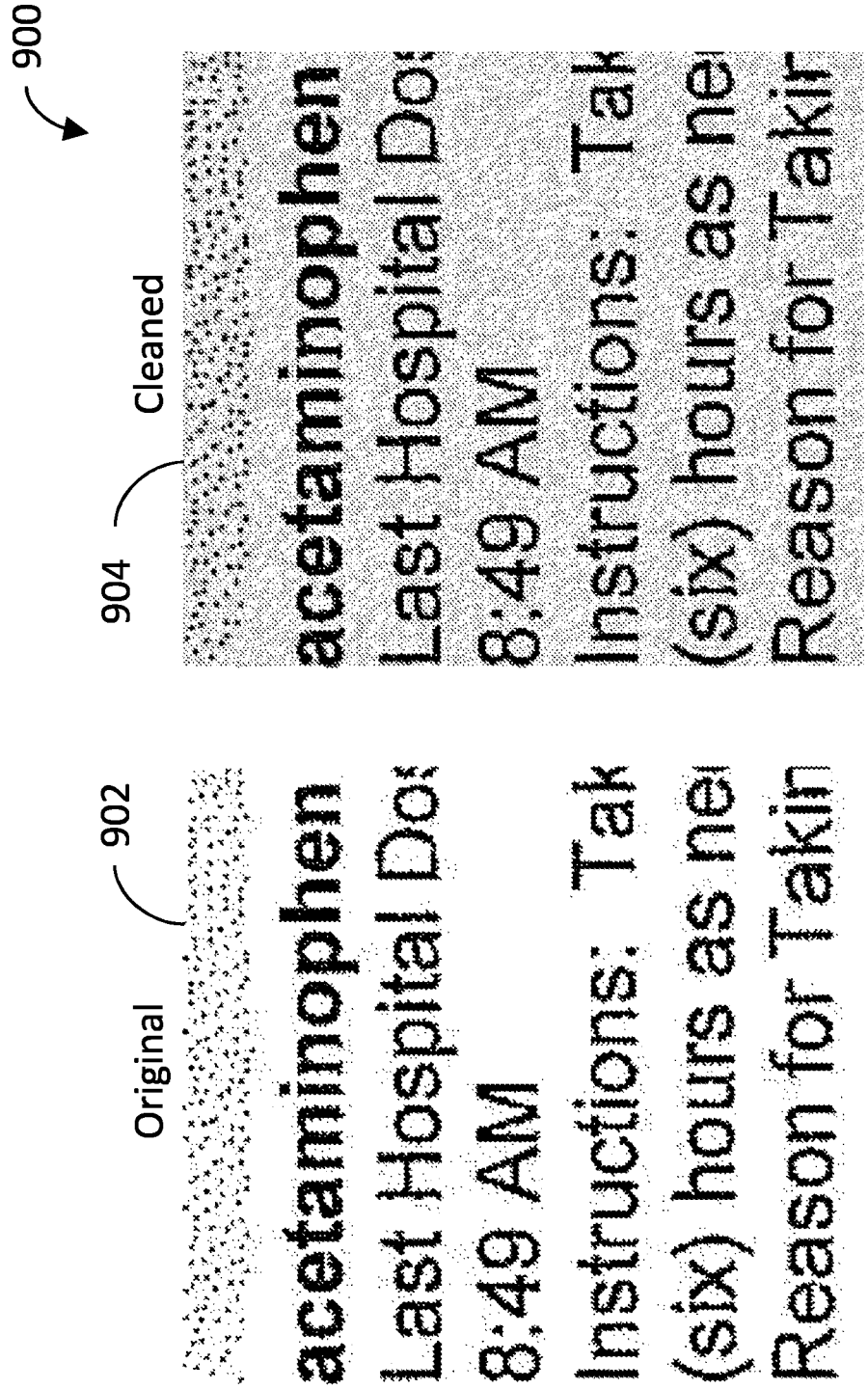

FIGS. 8, 9, and 10 show application of the cleaning text GAN in image comparisons 800, 900 and 1000 of distorted source text images and clean text images using a prototype source-to-clean text generator trained on computer generated clean text and hand selected distorted text. FIG. 8 shows image comparison 800 with a first original image of text 802 and the first clean image 804 after preprocessing with the prototype source-to-clean text generator. FIG. 9 shows image comparison 900 with a second original image of text 902 and the second clean image 904 after preprocessing with the prototype source-to-clean text generator. FIG. 10 shows comparison 1000 with a third original image of text 1002 and the third clean image 1004 after preprocessing with the prototype source-to-clean text generator.

Figure 11:
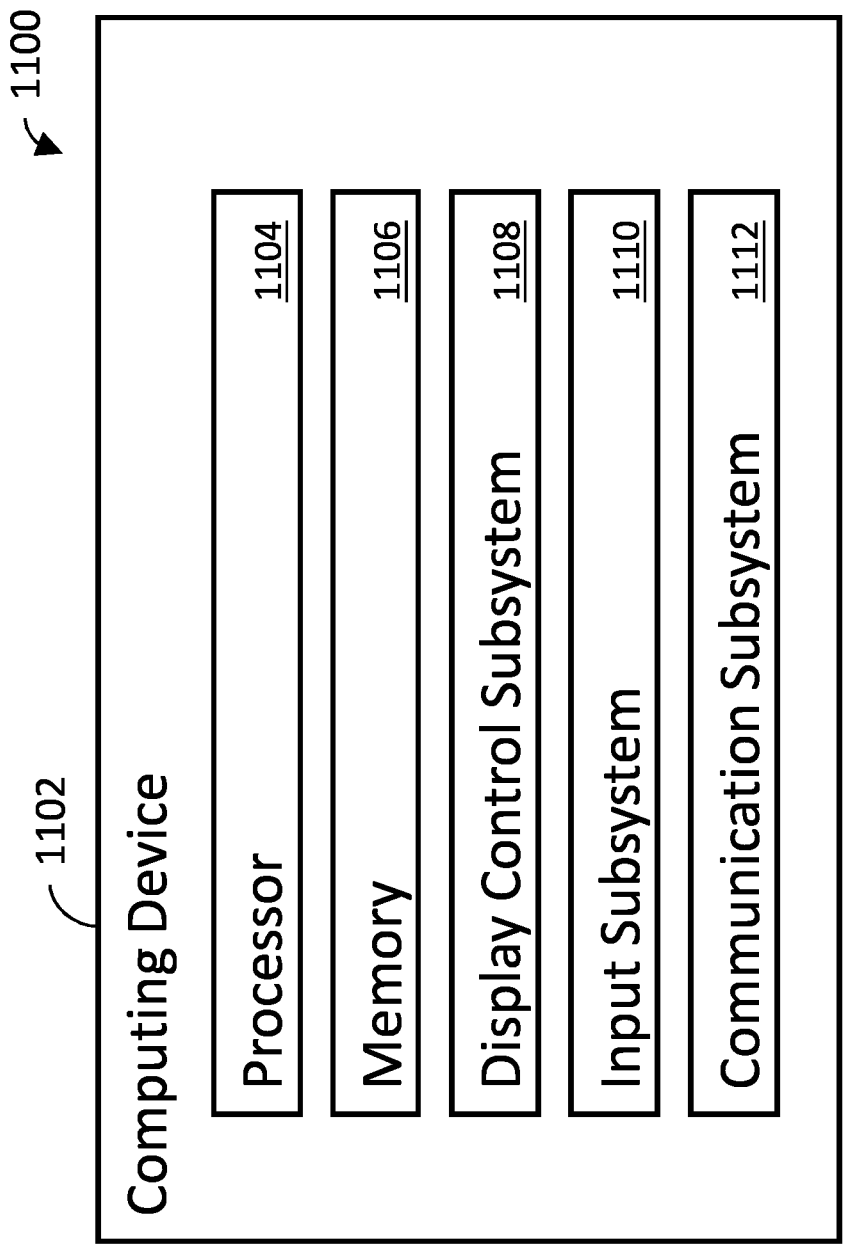
FIG. 11 illustrates a computing device.

FIG. 11 is a block diagram 1100 of a computing device 1102. The device 1102 comprises a processor 1104, a memory 1106, a display control subsystem 1108, an input subsystem 1110, and a communication subsystem 1112. The computing device 1102 may incorporated with the neural network developed with a cycle GAN to preprocess an image before OCR. The processor 1104 may be configured to execute machine-readable instructions. The processor 1104 may be configured to execute the instructions on one or more virtual or physical electronic processing devices. For example, the processor 1104 executes instructions to perform the steps and processes described in this document. The processor 1104 may include one or more processors to execute the machine-readable instructions.

The memory 1106 includes a computer-readable medium that contains instructions that the processor 1104 could execute. The computer-readable medium (also referred to as a processor-readable medium) may include any non-transitory ephemeral (like not radio waves), or tangible medium that participates in providing data (e.g., instructions) that may be read by the processor 1104 of the computing device 1102. Such a medium may take many forms, including, but not limited to, non-volatile media and volatile media. Non-volatile media may include, for example, optical or magnetic disks, solid-state memory, a floppy disk, a flexible disk, a hard disk, a magnetic tape, any other magnetic medium, a CD, a CD-ROM, a DVD, any other optical medium, punch cards, paper tape, any other physical medium with patterns of holes, ROM (Read Only Memory), a PROM (Programmable Read-Only Memory), an EPROM (Erasable Programmable Read-Only Memory), a FLASH-EPROM, a USB drive (e.g. Thumb Drive), SD cards, any other memory chip or cartridge, other persistent memory, or any other medium from which a computer can read.

Volatile media may include, for example, RAM (Random Access Memory) like static random-access memory (SRAM) or dynamic random-access memory (DRAM), which typically constitutes a main memory. The memory 1106 stores information and computer-executable instructions necessary to carry out the processes described in this document. The display control subsystem 1108 facilitates displaying the media by sending signals to a display screen.

The computing device 1102 provides an integrated display control subsystem 1108, memory 1106, and processor 1104 such that computing device 1102 executes the machine-readable media to provide the methods described in this document.

The input subsystem 1110 receives user input. The input subsystem 1110 connects to and receives input from devices such as a mouse, a keyboard, a touch screen, a touch screen with a keyboard, a touch screen with a number keypad, a microphone, a camera. For example, a user may indicate that the computing device 1102 is to execute a certain task, such as requesting the computing device 1102 to display any of the information described in this document.

The communication subsystem 1112 allows the execution of the methods described in this document over a network. For example, the communication subsystem 1112 enables the computing device 1102 to communicate with a plurality of other computing devices running the programs described in this document on other servers. The program may run on the other servers in parallel.

The communications subsystem 1112 is configured to receive computer instructions for the processor 1104, and those instructions are stored in the memory 1106. The communication subsystem 1112 is configured to communicate with a network by one or more transmission media, including wired (coaxial cables, copper wire and fiber optics, including the wires that comprise a system bus coupled to a processor of the computing device) or wireless.

The communication subsystem 1112 is equipped to communicate over many technologies that may be part of the network. For example, the communication subsystem 1112 could be equipped with a Wi-Fi module that connects to mobile hotspots (via WiFi) which may connect to the internet. Wireless communication includes a cellular wireless network, Wi-Fi communications network, a wired Ethernet network, or any communication means that facilitate networked communication with other computing devices. In addition, the communication subsystem 1112 is capable of communicating via any number of short-range wireless technologies, for example, Bluetooth, Near Field Communication (NFC), ZigBee, infrared, Wide Area Network (WAN), etc. In general, the processor 1104 is configured to receive instructions, for example from the memory 1106 and executes those instructions, thereby performing the functions described in this document. Such instructions and other data are stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. Although specific terms may be employed herein, they are used only in generic and descriptive sense and not for purposes of limitation. In other instances, specific features well known to those of ordinary skill in the art (for example training a Cycle Generative Adversarial Network, Levenshtein automaton model, a deep learning language model, etc.) have not been described in detail to avoid distraction. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as separately claimed subject matter.

What is claimed is:

1. A text extraction computing method, comprising:
calculating an estimated character pixel height of text from a digital source image having lines of text;
scaling the digital image using the estimated character pixel height and a preferred character pixel height;
binarizing the digital image; and
extracting characters from the digital image using an optical character recognizer;
where calculating the estimated character pixel height includes:
summarizing the rows of pixels into a horizontal projection,
determining a line-repetition period from the horizontal projection, and
quantifying the portion of the line-repetition period that corresponds to the text as the estimated character pixel height.

2. The text extraction computing method of claim 1, where determining the line-repetition period uses signal autocorrelation.

3. The text extraction computing method of claim 1, where determining the line-repetition period uses Fast Fourier Transform.

4. The text extraction computing method of comprising:
calculating an estimated character pixel height of text from a digital source image having lines of text;
scaling the digital image using the estimated character pixel height and a preferred character pixel height;

binarizing the digital image;
extracting characters from the digital image using an optical character recognizer;
de-skewing the digital source image by rotating the digital source image;
removing distortion from the digital source image; and
postprocessing the extracted characters;
where removing distortion uses a neural network trained by a cycle generative adversarial network on a set of source text images and a set of clean text images, where the set of source text images and the set of clean text images are unpaired, and where the source text images are distorted images of text.

5. The text extraction computing method of claim 4, where removing distortion and scaling uses a preprocessing neural network trained by a cycle generative adversarial network on a set of source text images and a set of clean text images, where the set of source text images and the set of clean text images are unpaired, and where the source text images include distorted images and the image text has noise.

6. The text extraction computing method of claim 4, where removing distortion, de-skewing, and scaling uses a preprocessing neural network trained using a cycle generative adversarial network on a set of source text images and a set of clean text images, where the set of source text images and the set of clean text images are unpaired, and where the source text images include distorted images and the image text has bad image lighting.

7. The text extraction computing method of claim 4, where removing distortions, de-skewing, de-warping uses a preprocessing neural network trained using a cycle generative adversarial network on a set of source text images and a set of clean text images, where the set of source text images and the set of clean text images are unpaired, and where the source text images include distorted images, and the image text is skewed, and the image text is warped.

8. The text extraction computing method of claim 4, where postprocessing includes a Levenshtein automaton model and a deep learning language model.

9. A text extraction computing method, comprising:
calculating an estimated character pixel height of text from a digital source image having lines of text;
scaling the digital image using the estimated character pixel height and a preferred character pixel height;
binarizing the digital image;
extracting characters from the digital image using an optical character recognizer, and
de-skewing the digital source image by rotating the digital source image;
removing distortion from the digital source image; and
postprocessing the extracted characters,
where removing distortion uses a preprocessing neural network trained by a cycle generative adversarial network on a set of source text images and a set of clean text images, where the source text images include distorted images.

10. The text extraction computing method of claim 9, where the distorted images have noise.

11. The text extraction computing method of claim 9, where the distorted images have bad image lighting.

12. The text extraction computing method of claim 9, where the distorted images include image text that are skewed, and image text that is warped.

13. The text extraction computing method of claim 9 where the set of source text images and the set of clean text images are unpaired.

* * * * *